(12) United States Patent
Morgan et al.

(10) Patent No.: US 11,302,057 B2
(45) Date of Patent: *Apr. 12, 2022

(54) RENDERING OF SOFT SHADOWS

(71) Applicant: Imagination Technologies Limited, Kings Langley (GB)

(72) Inventors: Gareth Morgan, San Francisco, CA (US); Luke T. Peterson, San Francisco, CA (US)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/112,605

(22) Filed: Dec. 4, 2020

(65) Prior Publication Data

US 2021/0090320 A1    Mar. 25, 2021

Related U.S. Application Data

(63) Continuation of application No. 16/820,339, filed on Mar. 16, 2020, now Pat. No. 10,885,699, which is a
(Continued)

(51) Int. Cl.
*G06T 15/00* (2011.01)
*G06T 15/06* (2011.01)
*G06T 15/60* (2006.01)

(52) U.S. Cl.
CPC .............. *G06T 15/06* (2013.01); *G06T 15/60* (2013.01)

(58) Field of Classification Search
CPC .................................. G06T 15/60; G06T 15/06
See application file for complete search history.

(56) References Cited

U.S. PATENT DOCUMENTS 7,973,790 B2 * 7/2011 Hempel .................. G06T 15/50
345/426
8,817,026 B1 8/2014 Zimmerman
(Continued)

OTHER PUBLICATIONS

Johnson et al., "Soft Irregular Shadow Mapping: Fast, High-Quality, and Robust Shadows," Proceedings of the 2009 Symposium on Interactive 3D Graphics and Games, (2009), pp. 57-66, ISBN 978-1-60558-429-4.
(Continued)

*Primary Examiner* — Sarah Lhymn
(74) *Attorney, Agent, or Firm* — Potomac Law Group, PLLC; Vincent M DeLuca

(57) ABSTRACT

Systems can identify visible surfaces for pixels in an image (portion) to be rendered. A sampling pattern of ray directions is applied to the pixels, so that the sampling pattern of ray directions repeats, and with respect to any pixel, the same ray direction can be found in the same relative position, with respect to that pixel, as for other pixels. Rays are emitted from visible surfaces in the respective ray direction supplied from the sampling pattern. Ray intersections can cause shaders to execute and contribute results to a sample buffer. With respect to shading of a given pixel, ray results from a selected subset of the pixels are used; the subset is selected by identifying a set of pixels, collectively from which rays were traced for the ray directions in the pattern, and requiring that surfaces from which rays were traced for those pixels satisfy a similarity criteria.

20 Claims, 9 Drawing Sheets

Related U.S. Application Data continuation of application No. 16/256,448, filed on Jan. 24, 2019, now Pat. No. 10,628,992, which is a continuation of application No. 14/644,557, filed on Mar. 11, 2015, now Pat. No. 10,229,526.

(60) Provisional application No. 61/952,379, filed on Mar. 13, 2014.

(56) References Cited

U.S. PATENT DOCUMENTS

| | | |
|---|---|---|
| 2004/0239673 A1 | 12/2004 | Schmidt |
| 2008/0174600 A1 | 7/2008 | Xie |
| 2008/0211804 A1 | 9/2008 | Hempel et al. |
| 2009/0167763 A1 | 7/2009 | Waechter et al. |
| 2009/0256845 A1* | 10/2009 | Sevastianov ............ G06T 15/40 345/426 |
| 2010/0073369 A1 | 3/2010 | McCombe et al. |
| 2010/0328310 A1* | 12/2010 | Peterson ................. G06T 15/06 345/426 |
| 2012/0001911 A1 | 1/2012 | Gautron et al. |
| 2013/0038696 A1 | 2/2013 | Ding et al. |

OTHER PUBLICATIONS

Laine et al., "Soft Shadow Volumes for Ray Tracing," ACM Transactions on Graphics, vol. 24, No. 3 (2005), pp. 1156-1165.

Overbeck et al., "A Real-time Beam Tracer with Application to Exact Soft Shadows," EGSR'07 Proceedings of the 18th Eurographics Conference on Rendering Techniques, (2007), pp. 85-98.

Sloan, "Stupid Spherical Harmonics (SH) Tricks," Feb. 2010, retrieved from www.ppsloan.org/publications.

Schwarz et al., "Bitmask Soft Shadows," Eurographics 2007, vol. 26, No. 3 (2007).

Atty et al., "Soft Shadow Maps: Efficient Sampling of Light Source Visibility," Computer Graphics Forum, vol. 25, No. 4 (2006) pp. 725-741.

Wald et al., "Interactive Global Illumination," Technical Report TR-2002-02, Computer Graphics Group, Saarland University (2002). (*Note: NPL in grandparent application*).

* cited by examiner

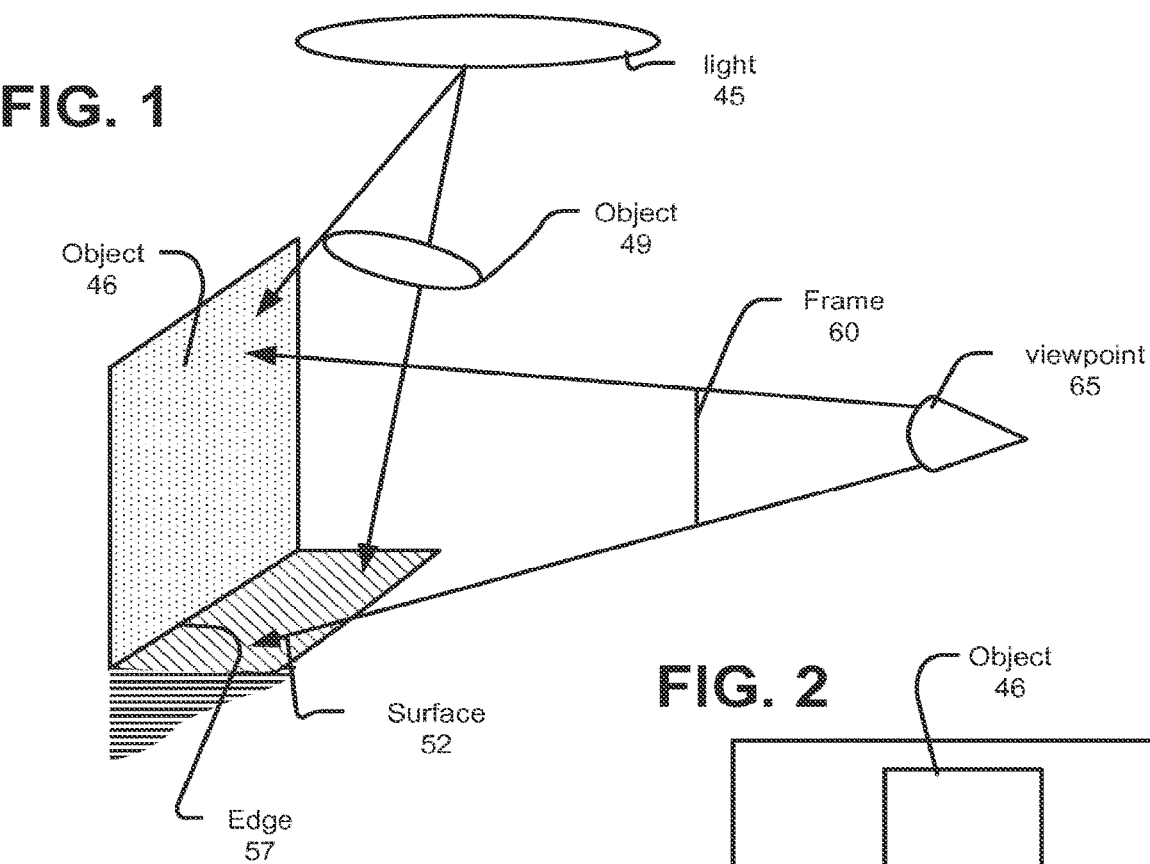
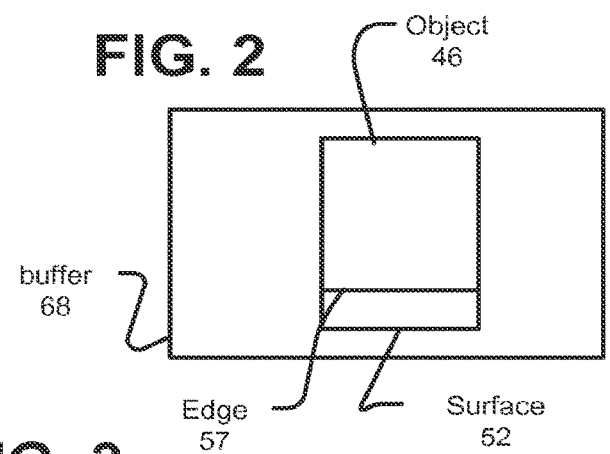
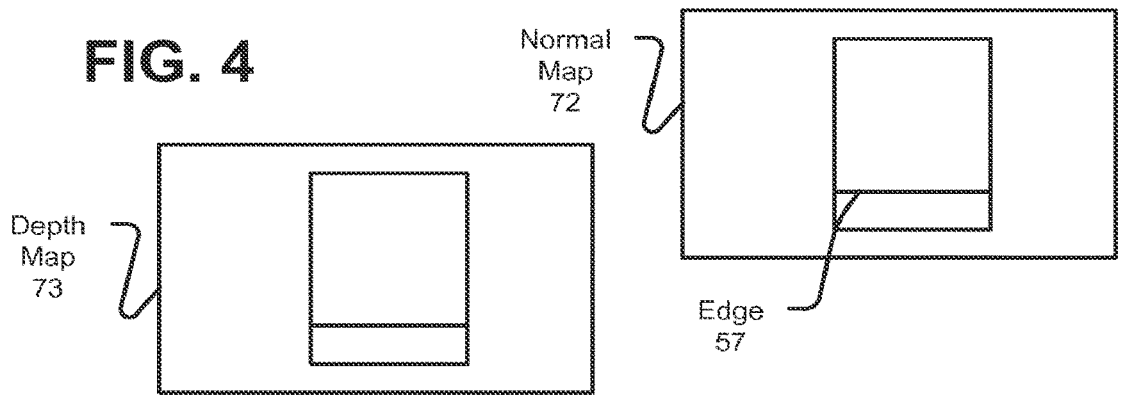

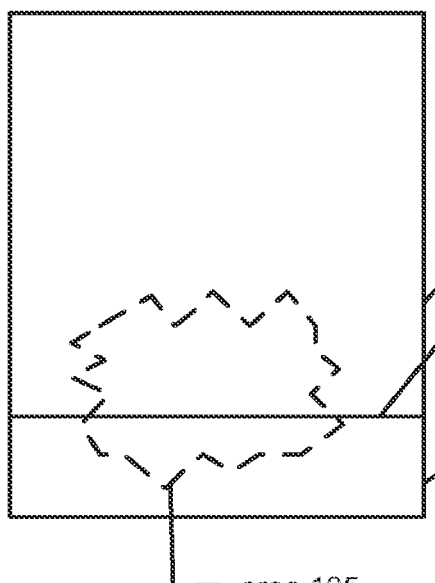
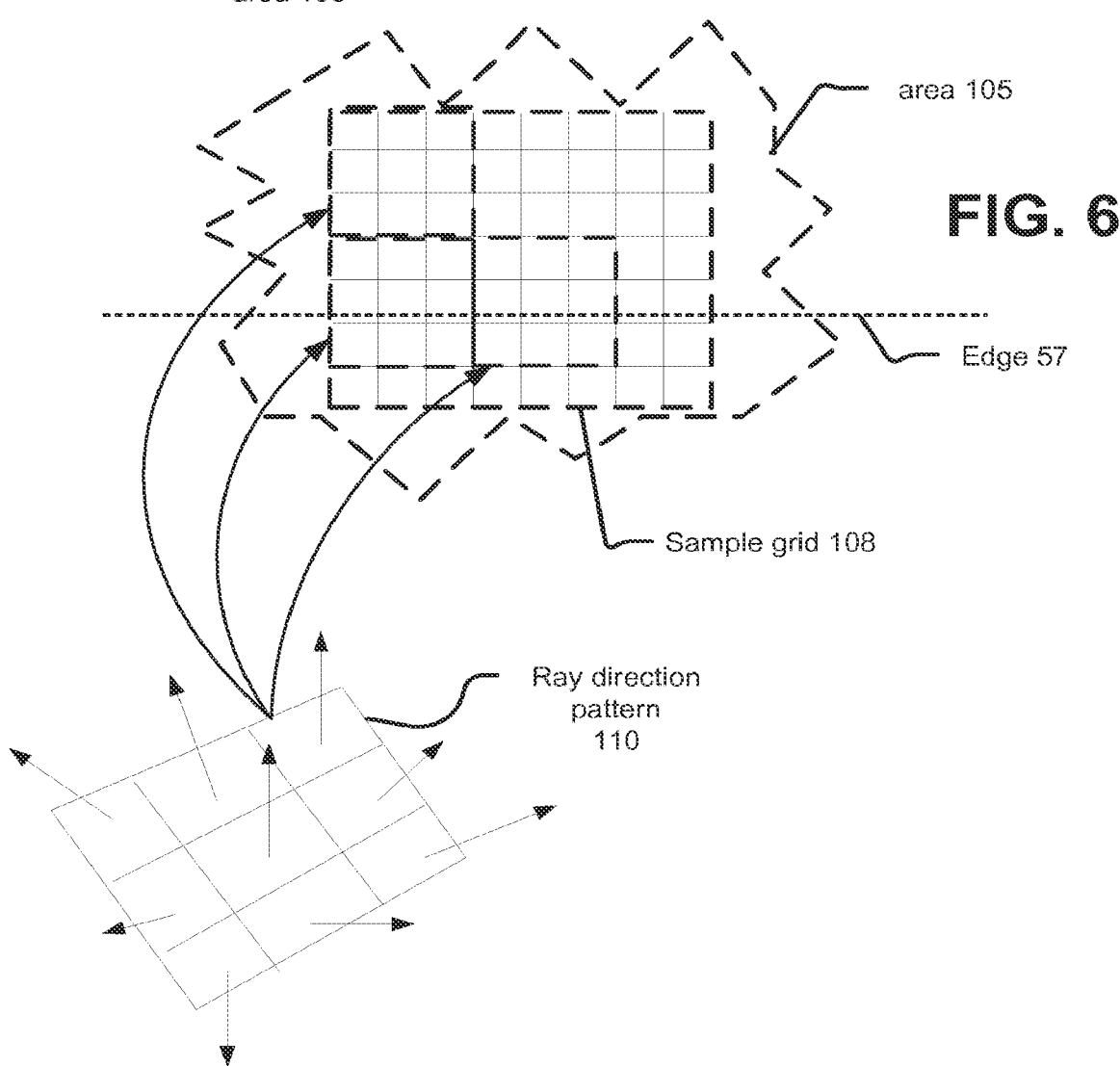

FIG. 11

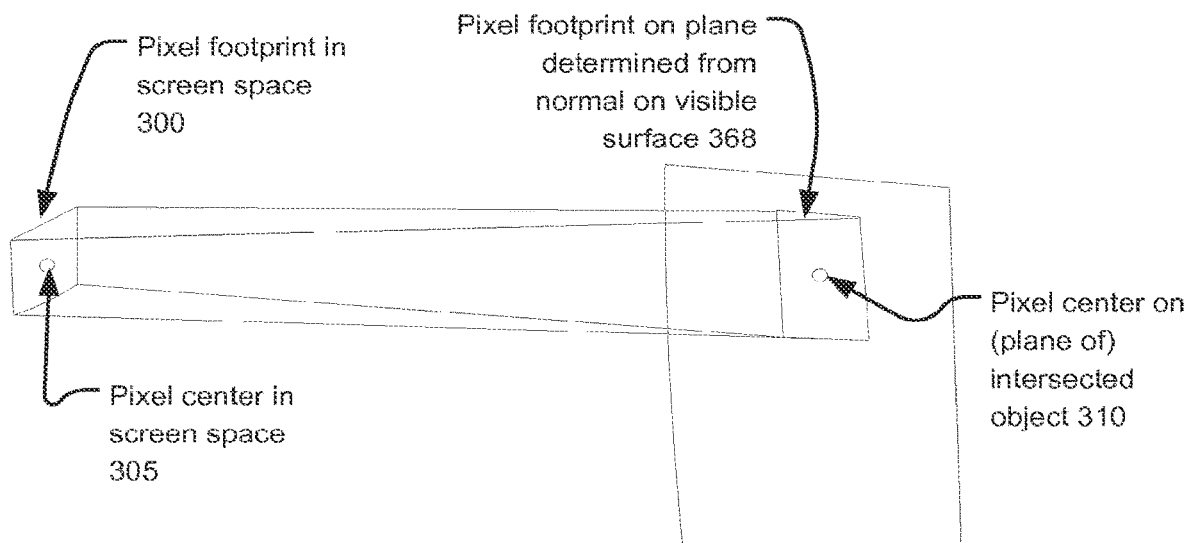

- Pixel footprint in screen space 300
- Pixel footprint on plane determined from normal on visible surface 368
- Pixel center in screen space 305
- Pixel center on (plane of) intersected object 310
- Plane defined by normal at projected pixel center 361

FIG. 12

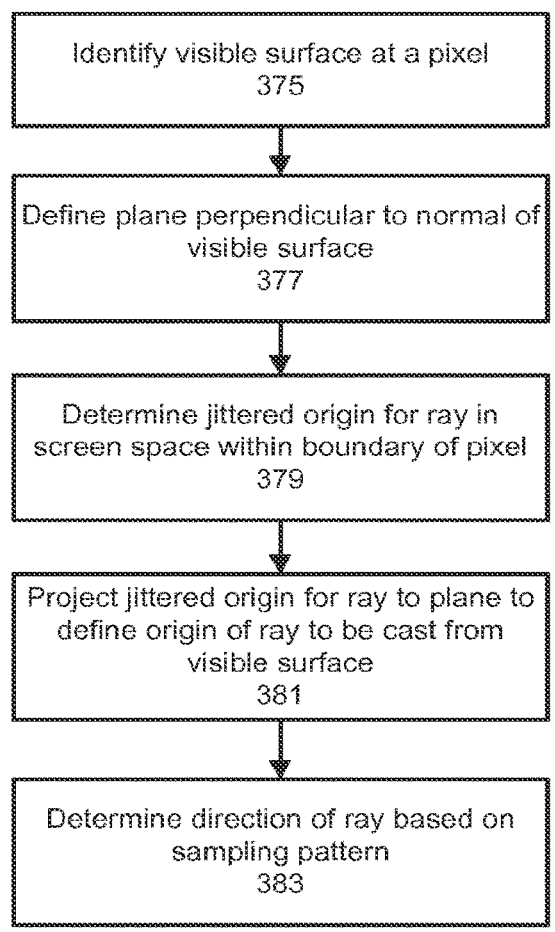

Identify visible surface at a pixel
375

↓

Define plane perpendicular to normal of visible surface
377

↓

Determine jittered origin for ray in screen space within boundary of pixel
379

↓

Project jittered origin for ray to plane to define origin of ray to be cast from visible surface
381

↓

Determine direction of ray based on sampling pattern
383

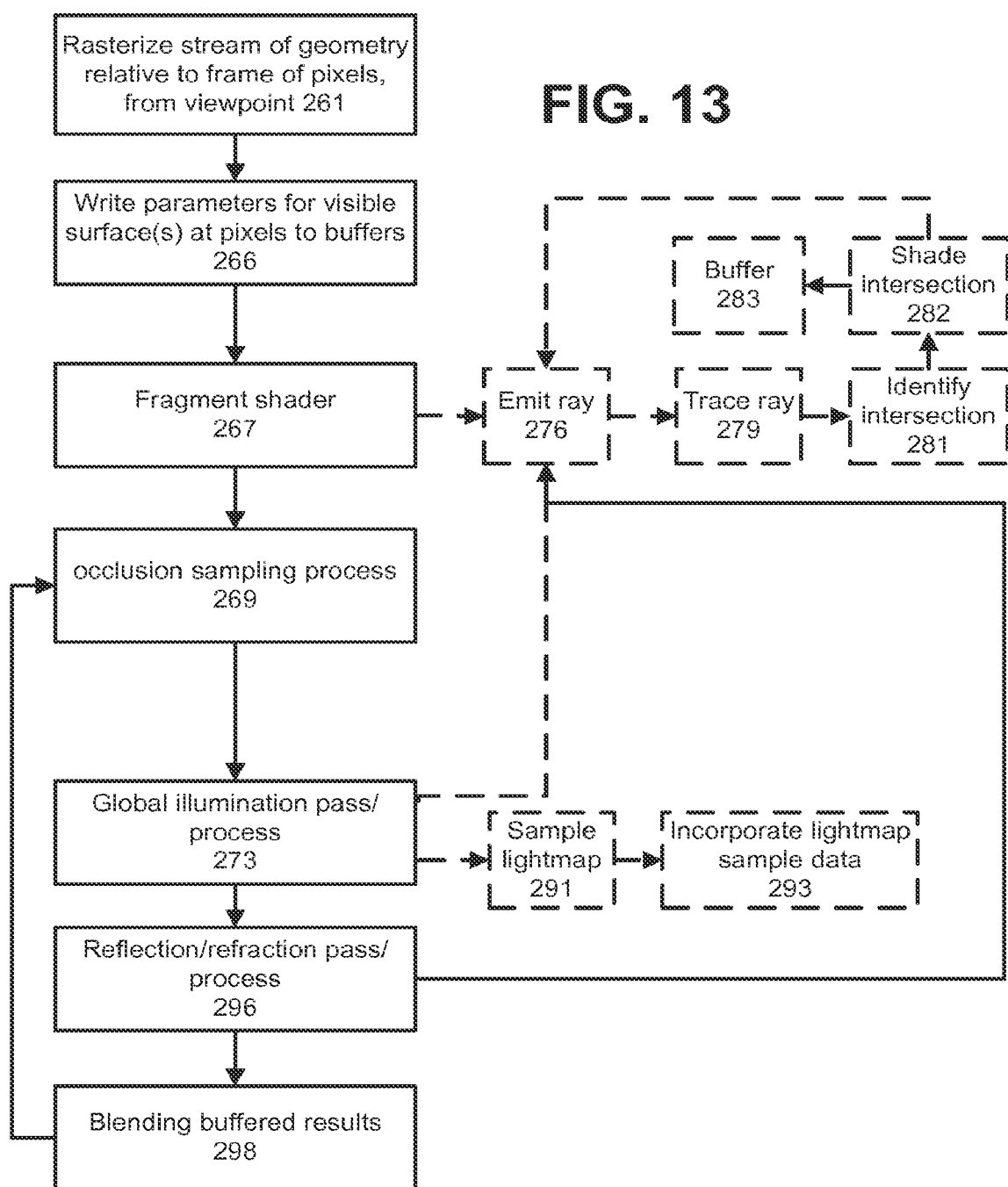

RENDERING OF SOFT SHADOWS

CROSS REFERENCE TO RELATED APPLICATIONS

This application is a continuation under 35 U.S.C. 120 of application Ser. No. 16/820,339 filed Mar. 16, 2020, which is a continuation of prior application Ser. No. 16/256,448 filed Jan. 24, 2019 (now U.S. Pat. No. 10,628,992), which is a continuation of prior application Ser. No. 14/644,557 filed Mar. 11, 2015 (now U.S. Pat. No. 10,229,526), which claims prior under 35 U.S.C. 119 from U.S. Provisional App. No. 61/952,379, filed on Mar. 13, 2014, and entitled "Rendering of Soft Shadows", which is incorporated by reference in its entirety herein for all purposes.

BACKGROUND

Field

In one aspect, the disclosure generally relates to 3-D rendering systems, system architectures, and methods, and in a more particular aspect, the disclosure relates to systems, architectures, and methods for asynchronous and concurrent hybridized rendering, such as hybridized ray tracing and rasterization-based rendering.

Description of Related Art

Graphics Processing Units (GPUs) provide highly paralleled rasterization-based rendering hardware. A traditional graphics processing unit (GPU) used a fixed pipeline only for rendering polygons with texture maps and gradually evolved to a more flexible pipeline that allows programmable vertex and fragment stages. Even though modern GPUs support more programmability of geometry and pixel processing, a variety of functions within a GPU are implemented in fixed function hardware. Modern GPUs can range in complexity, with high performance GPUs having transistor budgets on the order of 4-6 billion transistors. GPUs are often used in real time rendering tasks, and optimizations for many GPU applications involve determining shortcuts to achieve a desired throughput of frames per second, while maintaining a desired level of subjective video quality. For example, in a video game, realistic modeling of light behavior is not often an objective; rather, achieving a desired look or rendering effect is often a principal objective.

Traditionally, ray tracing is a technique used for high quality, non-real time graphics rendering tasks, such as production of animated movies, or producing 2-D images that more faithfully model behavior of light in different materials. In ray tracing, control of rendering and pipeline flexibility to achieve a desired result were often more critical issues than maintaining a desired frame rate. Also, some of the kinds of processing tasks needed for ray tracing are not necessarily implementable on hardware that is well-suited for rasterization.

SUMMARY

In one aspect, the disclosure relates to producing information describing occlusion of area lights on surfaces visible at pixels of a frame being rendered. In some more particular aspects, the disclosure relates to producing soft shadow information for pixels of a frame being rendered. Some aspects may use a hybridized renderer, which uses rasterization to identify visible surfaces at pixels of the frame, and then uses ray tracing for sampling occlusion. Some aspects use a sampling strategy in which a sample pattern is defined in screen space, and includes a set of ray directions. The sample pattern is tiled on the frame of pixels, such that each entry of the sample pattern is associated with one pixel, in one example, the sample pattern provides a circumstance in which each ray direction is in a predictable relative location.

For example, a process according to the disclosure involves rasterizing 3-D geometry in a 3-D scene to identify a visible surface for each pixel of a frame of pixels of an image. The process also involves determining a location on each visible surface from which to trace a ray, in a direction determined according to a pattern of ray directions arrayed on the frame of pixels, and selected to characterize whether the visible surface is occluded from an area light. The rays are traced and results of the tracing are stored in a buffer. The process also can include shading a given pixel of the frame of pixels, where the shading comprises identifying a respective set of pixels for the given pixel. The set of pixels is congruent with the pattern of ray directions. The process also includes blending the stored result of ray tracing for each pixel of the set of pixels which has a visible surface similar to the visible surface for the given pixel, in one or more parameters, within a threshold.

BRIEF DESCRIPTION OF THE DRAWINGS

For a fuller understanding of aspects and examples disclosed herein, reference is made to the accompanying drawings in the following description.

FIG. 1 depicts a toy 3-D scene used to describe context in which implementations of the disclosure can be applied;

FIGS. 2-4 depicts rasterization outputs for a frame of pixels rasterized from the 3-D scene of FIG. 1;

FIGS. 5-6 depicts an approach to sampling occlusion for pixels of the frame of pixels;

FIG. 11 depicts projecting a footprint of a pixel within a frame of pixels onto a surface;

FIG. 12 depicts an example process for jittering origins of rays traced for testing occlusion, according to the disclosure;

FIG. 13 depicts aspects of an example graphics processing pipeline that can implement aspects of the disclosure;

DETAILED DESCRIPTION

Figure 7:
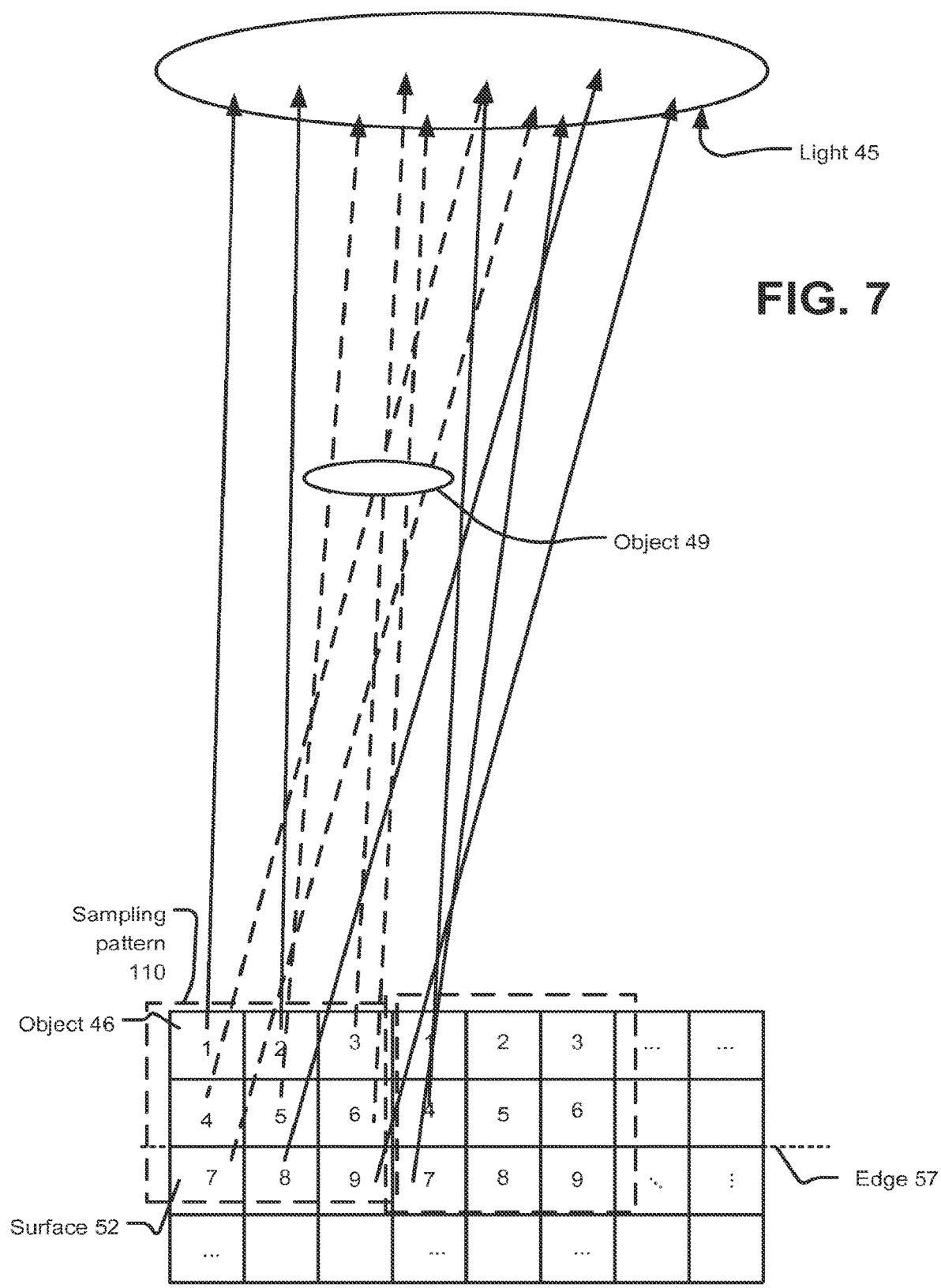
FIG. 7 depicts further aspects of sampling occlusion for the pixels of the frame of pixels.

The following description is presented to enable a person of ordinary skill in the art to make and use various aspects of the inventions. Descriptions of specific techniques, implementations and applications are provided only as examples. Various modifications to the examples described herein may be apparent to those skilled in the art, and the general principles defined herein may be applied to other examples and applications without departing from the scope of the invention.

FIG. 1 depicts a toy 3-D scene containing an object 46 that intersects a surface 52 at an edge 57. The 3-D scene includes an area light 45 and an object 49 that occludes parts of the scene from receiving light energy (represented by arrows) from light 45. An area light is a light that is not modeled as a single point in 3-D space. In this disclosure, an area light also includes a situation where a point light emits light energy through a diffractive media or a light scattering element. Thus, an area light is effectively a source of light onto objects, which comes from a variety directions, even though such directions still have some commonality. Faithfully representing occlusion from an area light involves modeling soft shadows, which include both an umbra and a penumbra. An umbra is an area that is entirely occluded from receiving light from the light source, while a penumbra is partially occluded.

The 3-D scene is viewed from a viewpoint 65, and a frame 60 of pixels is disposed between viewpoint 65 and at least a portion of the 3-D scene (e.g., viewpoint 65 can be in the 3-D scene, and there can be objects behind viewpoint 65, and so on). Viewpoint 65 can be a single point, but also can be an area or a range of points. In such a circumstance, points within the area, or in the range of points can each be treated as a separate viewpoint, for effects such as depth of field. As such, FIG. 1 does not imply Frame 60 is a single 2-D image to be created from the setup depicted. Frame 60 can represent one frame in a sequence of frames being created. Frame 60 also can represent any portion of an image being rendered, such as a tile or a macrotile of an image or other larger set of pixels. Frame 60 can have a resolution (e.g., a number of pixels and aspect ratio) selected according to an output resolution of a display, or for storage, for example. In some examples, such resolution may be relatively high resolutions, such as 1080P, 2K, 4K, or 8 k, or relatively lower resolutions. Some aspects of the disclosure relate to techniques for rendering images that include soft shadows caused by objects occluding surfaces that are visible at pixels of a frame of pixels (e.g., frame 60) being rendered.

In the following description, features of, and combinations of features in particular examples or embodiments may be set forth. However, merely setting forth these particular combinations of features does not imply that all such features are required to be present in a particular implementation or embodiment of the disclosure. The claims presented set forth the entire set of features that are required for the embodiment(s) of the disclosure to which each claim(s) pertain.

In one implementation, a rasterization pass identifies a respective surface that is visible at each pixel of frame 60. Such surface can be a surface of an object, e.g., object 46, or a background, a floor, and so on. An appearance of that visible surface should control the color and intensity of its pixel. These examples describe identifying "a visible surface" for a pixel, but such disclosure does not impliedly require that a single visible surface be identified for each visible surface, and in fact, some implementations may support identifying multiple visible surfaces for each pixel. For example, some techniques for anti-aliasing can use multiple samples for each pixel, and/or involve blending data from multiple pixels. In some implementations, a visible surface for a pixel is identified according to what surface is visible at a center of that pixel.

FIG. 2 depicts an output of rasterization, which includes a buffer 68 that stores data for a transformed 2-D view of object 46, and surface 52. Such data can include interpolated parameters associated with vertices defining the surface visible at that pixel. Edge 57 that corresponds to an intersection of object 46 and surface 52 is depicted. FIGS. 3 and 4 depict particular kinds of data that can be used in implementations of the disclosure. FIG. 3 depicts that a normal map 72 can be produced during rasterization and stored, such normal map can include a normal vector per pixel. A normal vector can be represented as a floating point tuplet, for example. Normal vectors can be normalized to a unit length. FIG. 4 depicts that a depth map 73, which can represent a depth for each pixel, as determined during rasterization. Such depth can be a depth of that visible surface at a location visible at that pixel, to viewpoint 65. Some implementations may use a single or double precision floating point number to represent such depth.

In one aspect of the disclosure, each pixel of frame 60 is sampled for occlusion from light 45 as described below. In order to characterize each pixel as being unoccluded, partially occluded (an amount of partial occlusion can vary), or entirely occluded, implementations perform sampling for the pixels, as explained below.

FIG. 5 shows an area 105 of the portion of the frame of pixels in Which object 46 and surface 52 were visible. Area 105 includes some of the pixels in which object 46 is visible and some of the pixels in which surface 52 is visible, as well as edge 57, where object 46 and surface 52 meet. FIG. 6 depicts that a sample grid 108 is arranged within area 105. In one approach, sample grid 108 is congruent with the pixels, such that there is one sample in sample grid 108 for each pixel. Sample grid 108 includes a repeating pattern of ray directions. In an example, ray direction pattern 110 is a 3×3 grid (and more generally, an n×n grid) that is tiled to form sample grid 108. Although the example depicts a square ray direction pattern, non-square ray direction patterns may be provided. Also, a number of ray directions represented in the ray direction pattern can be variable. The number of ray directions can be selected in accordance with one or more of characteristics of the light, for which occlusion is to be sampled, computation and storage capabilities of the platform implementing aspects of the disclosure, for example. For example, the ray directions can be determined based on a size and relative position of the light and can be selected to sampling coverage requirement. In one example, the ray directions are selected based on part to satisfy a low discrepancy sequence requirement. Thus, FIG. 6 depicts an implementation in which sampling grid 108 includes a repeating set of ray directions, where there is one ray direction associated with each pixel, and with respect to any arbitrary pixel in area 105, there can be found a respective pixel in a predictable location that has each ray direction in ray direction pattern 110.

FIG. 7 depicts that, for each pixel for which occlusion sampling is to be conducted (e.g., each pixel in frame 60), a ray is traced, from the surface that is visible at that pixel, in a direction determined by the ray direction associated with that pixel, through sampling pattern 110. In some implementations, a ray direction from the appropriate location in sampling pattern 110 can be used directly, although the disclosure does not preclude implementations that may modify the ray direction before tracing the ray, Such modification would be consistent with the sampling requirements. Thus, while the ray directions are initially assigned in screen-space, rays are emitted from surfaces located in 3-D space visible at those pixels. FIG. 7 depicts a situation where edge 57 separates a lower third of the samples in two adjacent instances of sampling pattern 110 (samples 7, 8 and 9 in each instance of sampling pattern 110). Thus, while these pixels are adjacent in screen space, the surfaces visible within the pixels of the sampling pattern are different. In the example, the ray directions are not modified based on what surface is visible.

Each of the rays is traced, which as described in more detail below, can include traversing the ray through an acceleration structure, and then determining whether each ray intersects any geometry other than light 45. As shown in FIG. 7, some rays traced intersect object 49 (shown as dashed lines), while other rays intersect light 45. For the rays that hit object 49, some implementations may characterize those rays as indicating that the effect of light 45 on that pixel (through the surface visible at that pixel) should be null (i.e., black, or the absence of light). Other implementations may allow execution of a shader that determines some contribution due to object 49. For example, an ambient color term could be contributed by a shader. By further example, when a given ray is found to hit light 45, a shader may be executed. However, in another example, the hit on light 45 for that pixel may simply be recorded in a buffer, and at another point, a shader for light 45 may be executed and the intersections between rays and light 45 can be given effect by that shader. Thus, FIG. 7 depicts that a ray is traced from a surface for each sample location (which each can be coincident with a pixel, in an example). Each traced ray thus has an effect that depends on whether or not that ray intersects the light or does not.

Figure 8A:
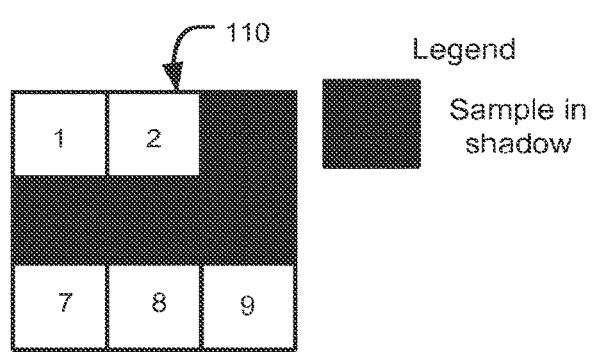
FIGS. 8A-C and 9A-C depict examples of combining values for the sampling of different pixels, in order to characterize occlusion at pixels of a frame of pixels.
Figure 8B:
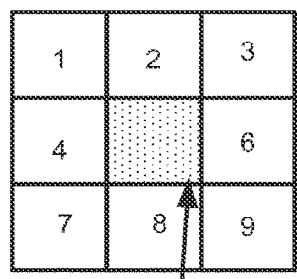
Figure 8C:
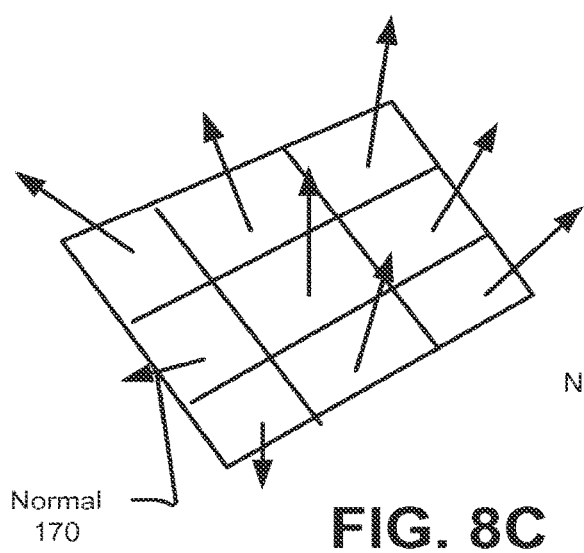

FIGS. 8A-C and FIGS. 9-C depict examples of how ray tracing results for different samples can be used to characterize occlusion of light 45 on the visible surface of a pixel. FIG. 8A shows a pattern of rays that have intersected an occluder (shown in black), and rays that have not (e.g., that have intersected the light being sampled). In FIGS. 8A-8C, the pixel being processed is the pixel corresponding to the ray from sample 5; the rays from samples 1-9 collectively include all ray directions from sample pattern 110, FIG. 8B shows a blended value for the pixel of sample 5. One example implementation uses an n×n sample pattern, such as a 3×3 sample pattern. For example, in a 3×3 sample pattern, all ray directions in that pattern are contained among the pixel and the eight other pixels surrounding that pixel. A pattern larger than 3×3 would not have such an arrangement; nevertheless, all ray directions would be available at predefined relative positions at each pixel (here, pixel and sample can be used interchangeably, since there is one sample per pixel and samples are co-extensive with pixels).

The blending shown in FIG. 8B is conditioned on a heuristic that distinguishes between samples that are for different visible surfaces, or for parts of a visible surface that are prone to have different occlusion properties than the location on the visible surface being sampled. The blending is intended to exclude such potentially differing samples, and retain those samples that are for proximate and similar surfaces to the visible surface at the pixel being processed. As an example, in FIG. 7, samples 7-9 of each of the two instances of sampling pattern 110 have a different visible surface (surface 52) than the visible surface for samples 1-6 (object 46).

In context of FIGS. 8A-8C, similarity of visible surfaces for samples 1-4 and 6-9 are compared with the visible surface for sample 5, where collectively samples 1-9 represent all ray directions of sample pattern 110. In one implementation, similarity of the visible surface include comparing a depth of each visible surface with the depth of the visible surface at the pixel being processed—i.e., a depth of visible surfaces for samples 1-4 and 6-9 are compared with a depth for the visible surface of sample 5.) FIG. 8C depicts a respective normal for each sample of FIG. 8A (normal 170 identified). These normals are compared for similarity. In an example, normals for other samples (1-4 and 6-9) that may contribute to the sample being processed (sample 5) are to be in a direction that is within a threshold of the direction of the normal for the sample being processed. Depths of the visible surfaces also can be compared for similarity. For example, a threshold can be set to avoid excluding different samples on a smoothly curved surface (e.g., a sphere), while excluding samples for sharply varying surfaces, or disparate surfaces. Smoothly is to be understood in context, as including a primitive mesh that approximates a given shape. For example, a sphere can be approximated by a piece-wise continuous mesh, the normal of the faces of the sphere within a particular region of the sphere can be expected to vary smoothly, where smoothly can be a relative term based on how many faces are used to approximate that sphere.) In determining similarity of depth. a threshold may be posed as a percentage or ratio of a depth, and not a fixed difference. As such, exclusion of samples deemed dissimilar, or inclusion of samples deemed similar can be performed by hardware programmed by software, such as a shader that can be programmed to operate based on the particulars of the geometry that is visible at the pixel being shaded, for example. In other examples, such inclusion/exclusion and blending of samples can be conducted by hardware that is configured with parameters or indicator(s) supplied by software, or with the geometry itself.

Ultimately, FIG. 8B depicts that none of the samples were excluded for dissimilarity, such that a blending of the different samples results in a blended result 155. Such blended result 155 can differ in different implementations. In some implementations, blended result 155 indicates a percentage to which light 45 should be occluded (or conversely, not occluded) at that pixel. The effects of this occlusion can be accounted for in a different shader. For example, in this example, 5 of 9 samples indicate no occlusion, such that this location would be in penumbra, but a particular color and intensity of the penumbra can still be dependent on characteristics (e.g., color and intensity) of light 45.

Figure 9A:
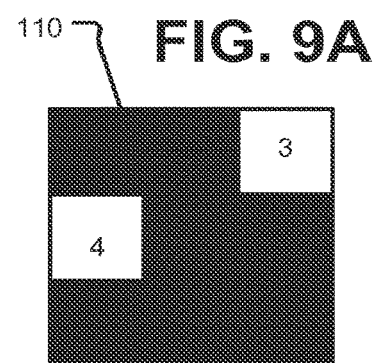
Figure 9B:
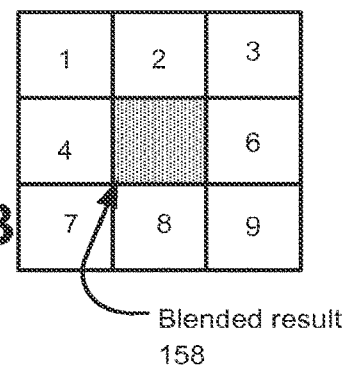
Figure 9C:
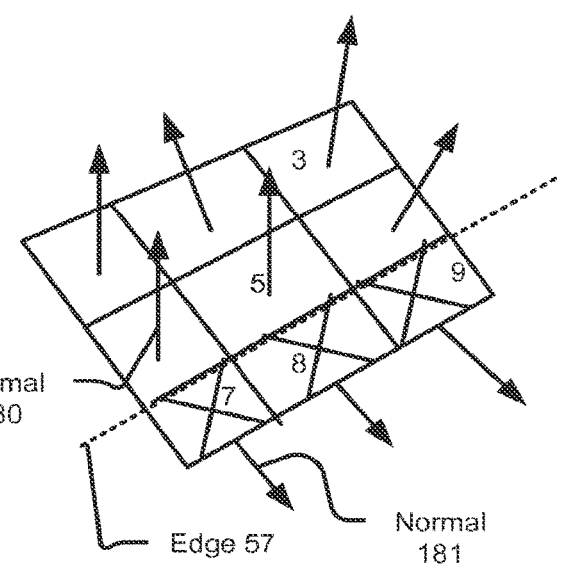

FIGS. 9A-9C depict a situation in which more samples are occluded and some samples are excluded for being dissimilar. In FIG. 9A are occluded (7 of 9 samples are occluded). FIG. 9C depicts a portion of a normal map pertaining to these samples, and shows that normals for some pixels point in disparate directions from the normal of the pixel being processed (again, the pixel of sample 5). As shown in FIG. 9C, this disparity is due to presence of two different surfaces within the samples, as shown by edge 57. Normal 180 and Normal 181 are representative of the different normals found within the sampling pattern. Samples that have the normal divergent from the sample being processed (i.e, normals for samples 7-9 differ from the normal of sample 5) are excluded from a blended result 158 depicted in FIG. 9B. Thus, FIG. 9B depicts a situation where only 6 samples contribute to blended result 158, and of these 6 samples, 4 are occluded shadow, so that blended result 158 is darker than blended result 155. The specific implication of how this affects final pixel values may vary among implementations.

FIGS. 9A-9C depicted that results of tracing rays from surfaces that are dissimilar from a given surface were excluded from results factored into characterizing occlusion at that given surface. In particular, FIGS. 9A-9C showed that such results were simply excluded, but were not replaced with other results. In another implementation, if a result is excluded due to dissimilar surfaces, an attempt can be made to replace that result with another result. The replacement result can be found based on identifying a ray traced for the same ray direction in the area, or along a direction of a result that was excluded, which originates from a different location. In particular, because results for tracing a ray in a given direction are located in predictable relative locations, another result can be identified and tested for similarity by offsetting from an excluded sample location based on that excluded sample location relative position in the sampling pattern. Such an approach can be appropriate in circumstances where thin occluders are present. Thin is relative to a size of the pixel pattern, in that little benefit would be expected from such a technique where multiple samples of the same ray direction within an area would be occluded.

Figure 10:
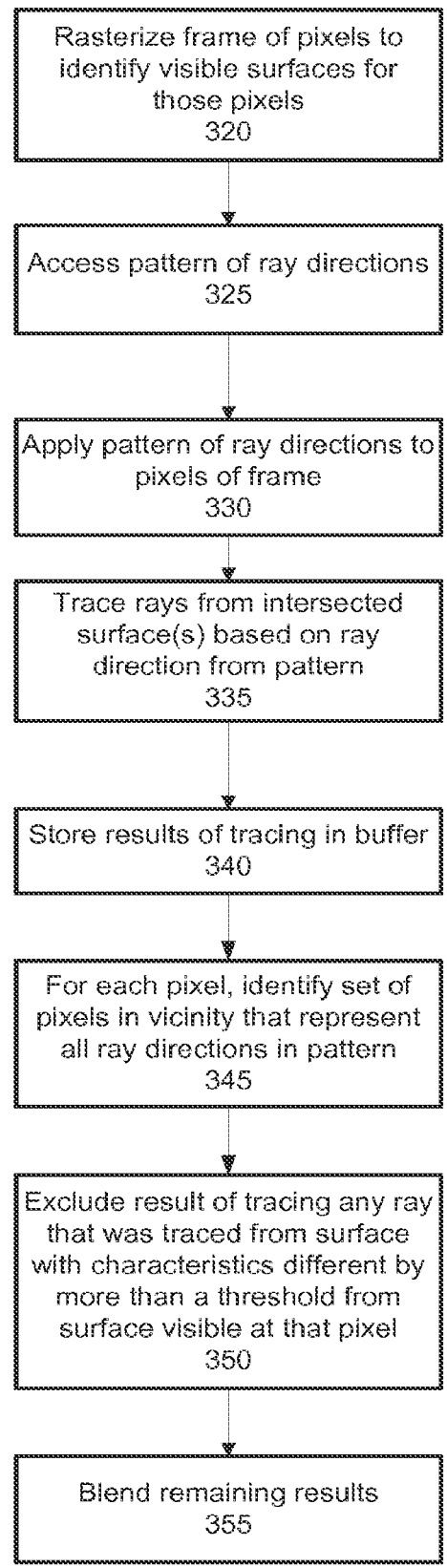
FIG. 10 depicts an example process implementing aspects of the disclosure.

FIG. 10 depicts an example process according to the disclosure. At 320, a rasterization is performed to identify a visible surface for each pixel of a frame of pixels. Any of a variety of approaches can be used to perform the rasterization, which can include projecting geometry into a 2-D coordinate system for the frame of pixels and identifying each pixel in the frame of pixels that is overlapped by each element of geometry. Rasterization can include tile-based deferred approaches, in which geometry is first binned according to region of screen space, and then per-pixel visibility determinations are made. At 325, a pattern of ray directions is accessed; the pattern of ray directions can be pre-calculated based on characteristics of the light. In other implementations, the pattern can be generated and accessed. At 330, that pattern is applied to pixels of the frame, as explained above. At 335, rays are traced from an intersected surface or surfaces for each pixel and results of tracing are stored in a buffer at 340. As explained above, results of the tracing also can vary in different implementations, including simply indicating hit or miss and data generated by executing a shader.

At 345, for each pixel, a set of pixels that represent all ray directions in the pattern is identified and at 350, results of tracing any ray from a surface with dissimilar characteristics are excluded, as explained above. At 355, remaining results for the tracing associated with pixels of the set are blended. A variety of approaches to blending according to the disclosure may be implemented, and a precise nature of such blending thus can be implementation-dependent. However, the blending involves using results of occlusion testing for visible surfaces at multiple pixels, qualified by similarity criteria, in determining a shading result.

Some implementations may entirely perform the tracing before beginning to blend results of the tracing, and other implementations may initiate tracing and then concurrently perform blending. Some implementations may emit the rays to be traced, and the tracing can be performed by a special purpose unit that includes fixed function or limited programmability hardware for performing intersection tests between rays and elements of an acceleration structure, and between rays and elements of scene geometry (e.g., triangular primitives). Such special purpose unit also may collect rays into groups and schedule particular groups of the rays for further processing. One criteria on which groups can be formed is that all rays of a group are to perform the same type of processing (e.g., further traversing a portion of an acceleration structure or testing a primitive for intersection), and another criteria is that all rays of a group will use the same element or elements of data in performing that processing. The special purpose unit can receive a ray to be traced and return a result of tracing that ray, without further management by a software process. Other implementations can involve software processes in determining what activity is performed by the special purpose unit (e.g., indicating particular tests to be performed for a particular ray or group of rays).

FIG. 11 depicts a further aspect that can be provided in implementations of the disclosure. A pixel has a screen-space footprint 300 in frame 60), which is a recognition that a pixel is not a simple point, but defines an area within frame 60. Pixel footprint 300 has a center 305. As explained above, rays are traced from visible surfaces at pixels of frame 60. Some implementations can trace such rays from a center of a projected footprint of each pixel onto the visible surface. Some implementations can trace such rays from a center of a projected footprint of each pixel onto a plane that is perpendicular to a normal of the visible surface at the center of the pixel, as shown in FIG. 11, where a pixel footprint 368 on plane 361 is shown, with pixel center 310 on plane 361.

Another implementation is to jitter (e.g., randomly or pseudo randomly change) an origin of each ray on the visible surface, or the plane. In one approach, such jitter is controlled so that the origin of the ray remains within the pixel footprint in screen space. In one implementation of that approach, a ray origin is defined first in screen-space (i.e., within a 2-D coordinate system of frame 60) and then that ray origin is projected onto the plane. For example, ray origins can be determined by applying a low discrepancy sequence to jitter the two dimensions of the 2-D coordinate system from a nominal center of a given pixel, in order to define an origin on the visible surface (or a plane perpendicular to the normal of the visible surface).

FIG. 12 depicts an example, in which a visible surface is identified, at 375, for a pixel. At 377, a plane perpendicular to normal of the visible surface at a location on the visible surface (e.g., at the projected pixel center). At 379, a jittered origin for the ray in screen space is determined and at 381, that jittered origin is projected to the plane. A ray is traced, in a direction determined according to a sampling pattern provided according to the aspects of the disclosure, from the origin, and a result of such tracing is used for characterizing occlusion of the surface at a set of pixels around that pixel.

FIG. 13 depicts an example processing pipeline according to aspects of the disclosure. At 261, a stream of geometry is rasterized, relative to a frame of pixels, from a viewpoint. Values resulting from rasterizing (e.g, visible surface information, such as interpolated parameters, such as normal and depths) are written to a buffer at 266. At 267, a fragment shader is executed. Such fragment shader, in some implementations, can, at 276, emit rays, which at 279 are traced, to identify, at 281, an intersection for each. Each intersection can be shaded, based on execution of shader code that can be associated with an intersected surface, or with the ray. At 283, results of the shader code execution can be buffered. Shading also can emit other rays to be traced. Additionally, at 269, an occlusion sampling process can be performed according to aspects of the disclosure. At 273, a global illumination pass or process can be conducted. Such pass can include performing further sampling of an environment around the surfaces visible at the pixels by emitting more rays to be traced. In another approach, global illumination can be characterized by performing lookups in a lightmap, at 291, associated with a particular visible surface, for example, and then blending lightmap data with other rendering data. At 296, a reflection/refraction pass also can be performed, for objects that have reflective and/or refractive properties. Some approaches may incorporate emission of rays for reflections or refractions into fragment shader at 267. At 298, blending of buffered results can be performed. Operations performed for such blending, as explained above, will vary based on the implementation. It should be appreciated, in particular, that a variety of equivalences to a particular blending approach may be realized.

The examples above focused on describing an implementing with a single sample pattern (e.g., 3×3) for a frame of pixels. However, some implementations may support using multiple sample patterns. Some implementations may support one pass of sampling with a given sample pattern, and then a subsequent pass with a different sample pattern. Such subsequent pass can focus on regions of the frame of pixels. Also, a sample pattern does not have to be constant from frame to frame, but can be changed.

Figure 14:
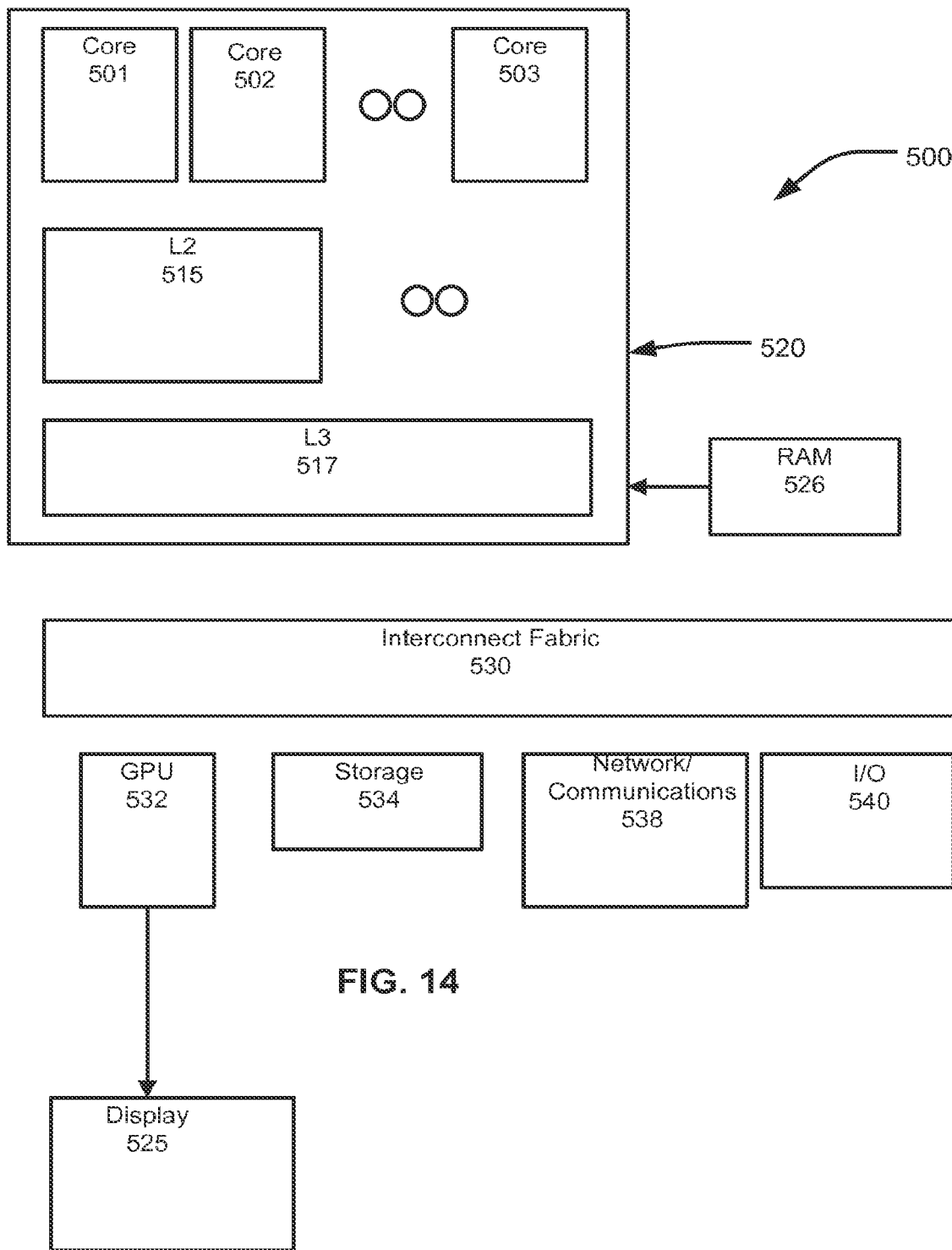
FIG. 14 depicts a block diagram of an example system that can implement aspects of the disclosure.

FIG. 14 depicts an example of a system 500 that can implement aspects of the disclosure. System 500 includes a set of processor cores 501-503, which can each be capable of executing one or more independent threads of control. Each such core 501-503 can have an instruction decoder, for decoding instructions according to an instruction set architecture. Each core can have a private Layer 1 cache. Each core 501-503 can support single instruction multiple data processing, such as a four-wide, eight-wide, sixteen-wide, twenty-four wide or thirty-two wide vector processing unit. The example system 500 includes a Layer 2 cache 515 shared between a subset of cores (e.g., cores 501 and 502). System 500 includes a Layer 3 cache 517 shared among all processor cores 501-503. These elements of system 500 can be included within a module 520 that can itself be tiled, Module 520 can have an interconnect or internal fabric that connects L3 517 with the cores and with L2. Cache coherency logic can be provided, to implement different cache coherence schemes. L1, L2 and L3 caches can be maintained to be inclusive or exclusive. A RAM 526 may serve all cores 501-503, and may be coherent or incoherent with respect to GPU 532. An interconnect fabric 530 can connect multiple modules 520, a Graphics Processing Unit 532, a storage unit 534 (e.g., mass storage such as magnetic hard drives, or flash memory), one or more network interfaces 538, and an input/output 540 interface, such as PCI-express, an optical interconnect Universal Serial Bus (USB), and so on. System 500 also can have a display 525, which can be coupled with GPU 532. As such, FIG. 14 depicts an example system that is generally in accordance with a conventional computation system, such as a personal computer, a server, a laptop, or even to a tablet or cellphone. Different of these system types can provide different numbers, configurations of the depicted elements, according to target design criteria, such as processing capability, power consumption, display resolution, and so on.

Figure 15:
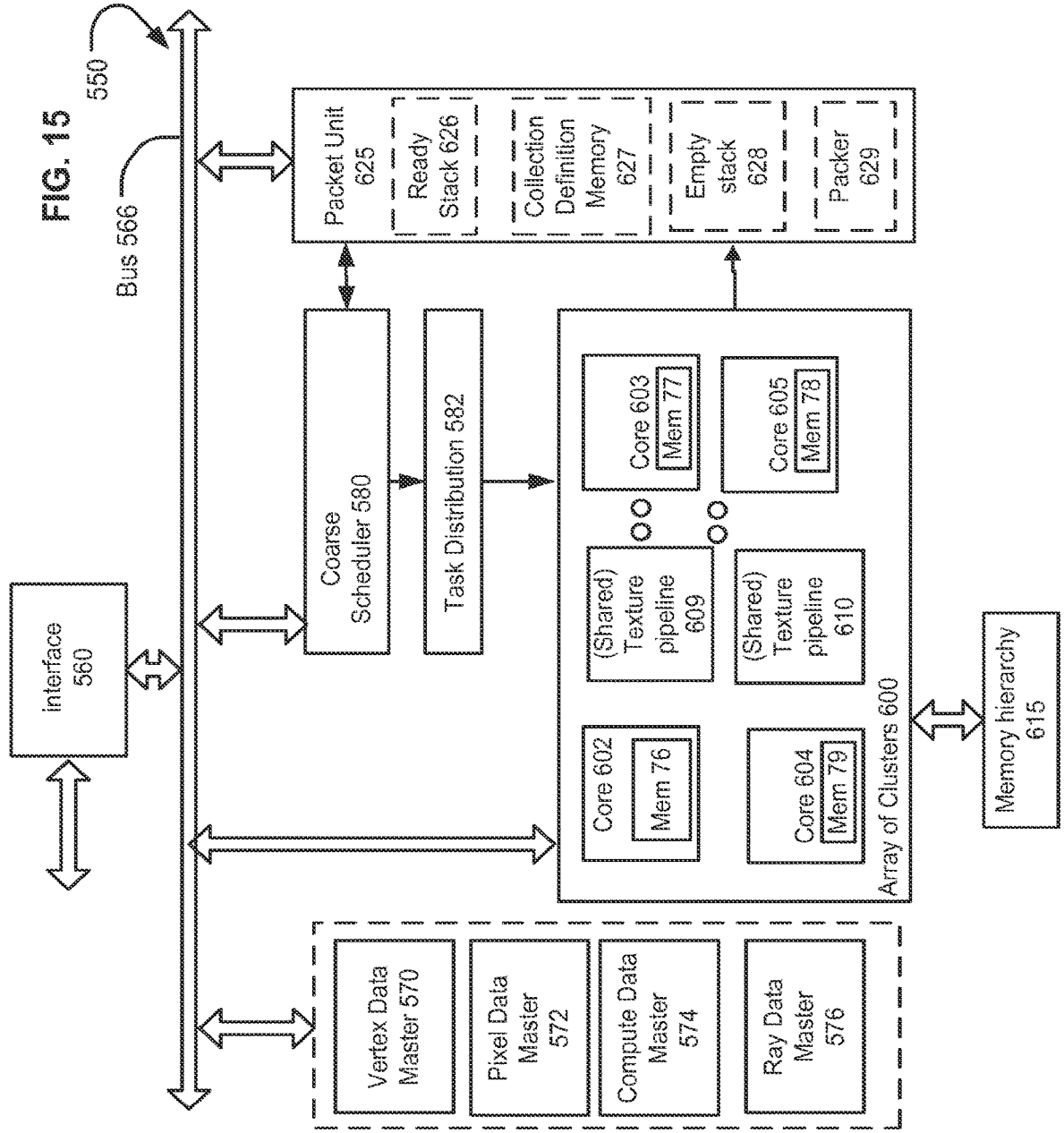
FIG. 15 depicts another example of a system that can implement aspects of the disclosure.

For example, a server can have a vastly higher power consumption envelope than a tablet form factors, as well as a higher pricepoint, which allows more processing capability in module 520, such as more cores, more complicated cores, such as out of order, multiple issue cores, wider SIMD vectors, larger caches, and so on. Some systems may implement many of the functional components shown in FIG. 14 within a system on chip. For example, cores 501-503 and CPU 532 may be monolithically fabricated, and may interface to an L3 cache formed on a separate die, FIG. 15 depicts an example of a hardware architecture 550 in which aspects of the disclosure can be implemented. FIG. 15 depicts that an array of computation clusters 600 provides a programmable set of computation elements that can be configured to perform computations such as geometry and pixel shading. Array 600 comprises a set of cores 602-605, each with respective local memories 76-79. Shared texture pipelines 609-610 can be used by cores 602-606. Texture pipelines 609-610 can operate to perform texture sampling, filtering, and other processes specific to texturing. Some applications may use texture pipelines 609-610 for more general filtering and blending or other more general purpose compute applications. A memory hierarchy 615 may comprise various levels of caching and mass data storage for use by array 600. A packet unit 625 may comprise a ready stack 626, a collection definition memory 627, an empty stack 628 and a packer 629. Packet unit 625 may operate to collect specific instances of computation against different scheduling keys and form collections of such instances grouped according to scheduling key. Collections that are ready for thither processing can be indicated by data on ready stack 626, while slots that are ready to be filled by new collections may be identified on empty stack 628. Packer 629 receives results of computations performed in array 600 and appends appropriate data to collections determined according to the received results. A set of data masters, including vertex 570, pixel 572, compute 574 and ray 576, determine workloads to be performed on array of clusters 600. A coarse scheduler 580 can determine a rough division of computation scheduling on array 600. A host interface 560 may be provided to connect to another computation unit, not depicted. A bus 566, which can be implemented as a switch fabric or other appropriate data distribution mechanism, sized and arranged according to the throughput and connectivity requirements of a particular implementation may be provided.

In the context of the present disclosure, the array of clusters 600 can execute shaders that determine what pixels have similar visible surfaces (e.g., in normal, depth, and/or normal and depth), blending, and ray emission. In some cases, the texture pipelines can be used to retrieve the shadow information from texture memory. These texture pipelines can be used to perform blending, or similarity determination in some approaches. Ray tracing can be performed by fixed function, or programmable elements that are controlled by packet unit 625.

For clarity in description, data for a certain type of object, a primitive (e.g., coordinates for three vertices of a triangle) often is described simply as the object itself, rather than referring to the data for the object. For example, if referring to "fetching a primitive", it is to be understood that data representative of that primitive is being fetched.

Modern general purpose processors regularly require in excess of two billion transistors to be implemented, while specialized processing units, such as graphics processing units, may have in excess of five billion transistors. Such transistor counts are likely to increase. Such processors have used these transistors to implement increasing complex operation reordering, prediction, more parallelism, larger memories (including more and bigger caches) and so on. As such, it becomes necessary to be able to describe or discuss technical subject matter concerning such processors, whether general purpose or application specific, at a level of detail appropriate to the technology being addressed. In general, a hierarchy of concepts is applied to allow those of ordinary skill to focus on details of the matter being addressed. This applies equally to services supplied using such processors by machine executable code executing thereon.

When addressing some particular feature of an application or process, it may be appropriate to identify substituent functional components, and abstract some of these functional components, while providing more detail as to other components. In other circumstances, a particular combination of functions itself describes patentable innovation, aside from the particular examples of structures in a specification that may be used in describing such combination.

When a processor or processors is configured by machine readable code to perform a function or set of functions, that processor or processors, or portion(s) thereof effectively become circuitry for performing that function or set of functions. Such circuitry may interface with other structural elements, such as memories, user interface components, network interfaces, and so on. Configuration of such processor(s) also changes as different parts of machine code are used to configure the same or different constituent elements of such processor(s). As such, although it would be possible to describe a circuit resulting from configuring a processor to perform a series of instructions, such explanation would be unhelpful to a person of ordinary skill in the art, who would rather be taught more specifically about the technology contributed by Applicant's disclosure.

As such, the term "circuitry" does not imply a single electrically connected set of circuits. Circuitry may be fixed function, configurable, or programmable. In general, circuitry implementing a functional unit is more likely to be configurable, or may be more configurable, than circuitry implementing a specific portion of a functional unit. For example, an Arithmetic Logic Unit (ALU) of a processor may reuse the same portion of circuitry differently when performing different arithmetic or logic operations. As such, that portion of circuitry is effectively circuitry or part of circuitry for each different operation, when configured to perform or otherwise interconnected to perform each different operation. Such configuration may come from or be based on instructions, or microcode, for example.

In all these cases, describing portions of a processor in terms of its functionality conveys structure to a person of ordinary skill in the art. In the context of this disclosure, the term "unit" refers, in some implementations, to a class or group of circuitry that implements the functions or functions attributed to that unit. Such circuitry may implement additional functions, and so identification of circuitry performing one function does not mean that the same circuitry, or a portion thereof, cannot also perform other functions. In some circumstances, the functional unit may be identified, and then functional description of circuitry that performs a certain feature differently, or implements a new feature may be described.

Although circuitry or functional units described herein may be most frequently implemented by electrical circuitry, and more particularly, by circuitry that primarily relies on a transistor implemented in a semiconductor as a primary switch element, this term is to be understood in relation to the technology being disclosed. For example, different physical processes may be used in circuitry implementing aspects of the disclosure, such as optical, nanotubes, micro-electrical mechanical elements, quantum switches or memory storage, magnetoresistive logic elements, and so on. Although a choice of technology used to construct circuitry or functional units according to the technology may change over time, this choice is an implementation decision to be made in accordance with the then-current state of technology. This is exemplified by the transitions from using vacuum tubes as switching elements to using circuits with discrete transistors, to using integrated circuits, and advances in memory technologies, in that while there were many inventions in each of these areas, these inventions did not necessarily fundamentally change how computers fundamentally worked. For example, the use of stored programs having a sequence of instructions selected from an instruction set architecture was an important change from a computer that required physical rewiring to change the program, but subsequently, many advances were made to various functional units within such a stored-program computer.

Functional modules may be composed of circuitry, where such circuitry may be fixed function, configurable under program control or under other configuration information, or some combination thereof. Functional modules themselves thus may be described by and/or named according to or based on the function(s) performed, to helpfully abstract how some of the constituent portions of such functions may be implemented.

In some situations, circuitry and functional modules may be described partially in functional terms, and partially in structural terms. In some situations, the structural portion of such a description may be described in terms of a configuration applied to circuitry or to functional modules, or both.

Although some subject matter may have been described in language specific to examples of structural features and/or method steps, it is to be understood that the subject matter defined in the appended claims is not necessarily limited to these described features or acts. For example, a given structural feature may be subsumed within another structural element, or such feature may be split among or distributed to distinct components. Similarly, an example portion of a process may be achieved as a by-product or concurrently with performance of another act or process, or may be performed as multiple separate acts in some implementations. As such, implementations according to this disclosure are not limited to those that have a 1:1 correspondence to the examples depicted and/or described.

Although some subject matter may have been described in language specific to examples of structural features and/or method steps, it is to be understood that the subject matter defined, in the appended claims is not necessarily limited to these described features or acts. For example, a given structural feature may be subsumed within another structural element, or such feature may be split among or distributed to distinct components. Similarly, an example portion of a process may be achieved as a by-product or concurrently with performance of another act or process, or may be performed as multiple separate acts in some implementations. As such, implementations according to this disclosure are not limited to those that have a 1:1 correspondence to the examples depicted and/or described.

Above, various examples of computing hardware and/or software programming, were explained, as well as examples how such hardware/software can intercommunicate. These examples of hardware or hardware configured with software and such communications interfaces provide means for accomplishing the functions attributed to each of them. For example, a means for performing implementations of each of the processes described herein includes machine executable code used to configure a machine to perform such process implementation. Other means for realizing implementations of the disclosed processes includes using special purpose or limited-programmability hardware to realize portions of the processes, while allocating overall control and management and a decision when to invoke such hardware to software executing on a general purpose computer. Combinations of software and hardware may be provided as a system to interface with software provided by third parties. Such third party software may be written to use a programming semantic specified by the API, which may provide specified built-in functions or provide a library of techniques that may be used during ray tracing based rendering.

Aspects of functions, and methods described and/or claimed may be implemented in a special purpose or general-purpose computer including computer hardware, as discussed in greater detail below. Such hardware, firmware and software can also be embodied on a video card or other external or internal computer system peripherals. Various functionality can be provided in customized FPGAs or ASICs or other configurable processors, while some functionality can be provided in a management or host processor. Such processing functionality may be used in personal computers, desktop computers, laptop computers, message processors, hand-held devices, multi-processor systems, microprocessor-based or programmable consumer electronics, game consoles, network PCs, minicomputers, mainframe computers, mobile telephones, PDAs, tablets and the like.

Aspects disclosed herein will generally exist in the context of larger systems and components of systems. For example, processing can be distributed over networks, such as local or wide area networks and may otherwise be implemented using peer to peer technologies and the like. Division of tasks can be determined based on a desired performance of the product or system, a desired price point, or some combination thereof. In embodiments implementing any of the described units at least partially in software, computer-executable instructions representing unit functionality can be stored on computer-readable media, such as, for example, magnetic or optical disks, flash memory, USB devices, or in networks of storage devices such as NAS or SAN equipment, and the like, Other pertinent information, such as data for processing can also be stored on such media.

In addition to hardware embodiments (e.g., within or coupled to a Central Processing Unit ("CPU"), microprocessor, microcontroller, digital signal processor, processor core, System on Chip ("SOC"), or any other programmable or electronic device), implementations may also be embodied in software (e.g., computer readable code, program code, instructions and/or data disposed in any form, such as source, object or machine language) disposed, for example, in a computer usable (e.g., readable) medium configured to store the software. Such software can enable, for example, the function, fabrication, modeling, simulation, description, and/or testing of the apparatus and methods described herein. For example, this can be accomplished through the use of general programming languages (e.g., C, C++), GDSII databases, hardware description languages (HDL) including Verilog HDL, VHDL, SystemC Register Transfer Level (RTL) and so on, or other available programs, databases, and/or circuit (i.e., schematic) capture tools. Embodiments can be disposed in computer usable medium including non-transitory memories such as memories using semiconductor, magnetic disk, optical disk, ferrous, resistive memory, and so on.

As specific examples, it is understood that implementations of disclosed apparatuses and methods may be implemented in a semiconductor intellectual property core, such as a microprocessor core, or a portion thereof, embodied in a Hardware Description Language (HDL)), that can be used to produce a specific integrated circuit implementation. A computer readable medium may embody or store such description language data, and thus constitute an article of manufacture. A non-transitory machine readable medium is an example of computer readable media. Examples of other embodiments include computer readable media storing Register Transfer Language (RTL) description that may be adapted for use in a specific architecture or microarchitecture implementation. Additionally, the apparatus and methods described herein may be embodied as a combination of hardware and software that configures or programs hardware.

Also, in some cases terminology has been used herein because it is considered to more reasonably convey salient points to a person of ordinary skill, but such terminology should not be considered to impliedly limit a range of implementations encompassed by disclosed examples and other aspects. For example, a ray is sometimes referred to as having an origin and direction, and each of these separate items can be viewed, for understanding aspects of the disclosure, as being represented respectively as a point in 3-D space and a direction vector in 3-D space. However, any of a variety of other ways to represent a ray can be provided, while remaining within the present disclosures. For example, a ray direction also can be represented in spherical coordinates. It also would be understood that data provided in one format can be transformed or mapped into another format, while maintaining the significance of the information of the data originally represented.

Also, a number of examples have been illustrated and described in the preceding disclosure, each illustrating different aspects that can be embodied systems, methods, and computer executable instructions stored on computer readable media according to the following claims. By necessity, not every example can illustrate every aspect, and the examples do not illustrate exclusive compositions of such aspects. Instead, aspects illustrated and described with respect to one figure or example can be used or combined with aspects illustrated and described with respect to other figures. As such, a person of ordinary skill would understand from these disclosures that the above disclosure is not limiting as to constituency of embodiments according to the claims, and rather the scope of the claims define the breadth and scope of inventive embodiments herein. The summary and abstract sections may set forth one or more but not all exemplary embodiments and aspects of the invention within the scope of the claims.

What is claimed is:

1. A computer-implemented method of rendering an image of a 3-D scene, comprising:
   associating each of a plurality of pixels of a frame with a ray direction and with a position within the 3-D scene; and
   for each of said plurality of pixels of the frame:
      tracing a ray through the 3-D scene, from the position within the 3-D scene associated with that pixel and in the ray direction associated with that pixel;
      characterizing occlusion of a source of light at the position within the 3-D scene associated with that pixel, by using a result of the ray tracing for pixels in a subset of pixels of the frame in the vicinity of that pixel; and
      producing a value for that pixel by using results of the occlusion characterization for that pixel.

2. The method of claim 1, wherein at least some of the pixels in the subset are associated with different ray directions.

3. The method of claim 2, wherein tracing a ray through the 3-D scene, from the position within the 3-D scene associated with that pixel comprises tracing a ray through the 3-D scene, from the visible surface identified for that pixel.

4. The method of claim 1, further comprising identifying a visible surface for each pixel of said plurality of pixels.

5. The method of claim 4, wherein characterizing occlusion of a source of light at the position within the 3-D scene associated with that pixel comprises characterizing occlusion of a source of light on the identified visible surface for that pixel by using a result of the ray tracing for pixels in a subset of pixels of the frame in the vicinity of that pixel.

6. The method of claim 1 wherein said characterizing occlusion of a source of light at the position within the 3-D scene associated with that pixel, by using a result of the ray tracing for pixels in a subset of pixels of the frame in the vicinity of that pixel comprises:
identifying an initial set of pixels around that pixel; and
identifying the subset of pixels by excluding from the identified initial set of pixels any pixel with a visible surface that has a respective value for one or more parameters that differs by more than a threshold amount from a respective value of those one or more parameters for a visible surface of that pixel of the frame.

7. The method of claim 6, wherein said initial set of pixels comprises an equal number of pixels associated with each of a plurality of different ray directions.

8. The method of claim 6, wherein identifying the subset of pixels further comprises attempting to replace the value of an excluded pixel with another value determined by tracing a ray in the same direction as a ray direction associated with the excluded pixel.

9. The method of claim 6, further comprising storing a normal vector for the respective visible surface for a particular pixel in a buffer, and performing the excluding for the particular pixel by accessing the normal vectors for the visible surface for the pixels in the initial set of pixels and comparing the normal vector for the particular pixel with the normal vectors for the other pixels in the initial set of pixels.

10. The method of claim 6, further comprising storing a depth for the respective visible surface for a particular pixel in a buffer, and performing the excluding for the particular pixel by excluding from the initial set of pixels any pixels that have depths that differ from the respective depth of the visible surface for the particular pixel by more than a threshold.

11. The method of claim 6, further comprising:
determining whether a depth of each visible surface differs by more than a depth threshold from the depth of the visible surface for the pixel being processed; and
setting the depth threshold as a maximum percentage of the depth of the visible surface for the pixel being processed.

12. The method of claim 1,
wherein associating each of said plurality of pixels of the frame with a ray direction comprises using a pattern of ray directions to associate each of said plurality of pixels of the frame with a ray direction of said pattern of ray directions by tiling the pattern of ray directions on the plurality of pixels of the frame such that each pixel of the plurality of pixels is associated with one ray direction of the pattern of ray directions; and
wherein, for each of said plurality of pixels of the frame:
characterizing occlusion of a source of light at the position within the 3-D scene associated with that pixel comprises identifying the subset of pixels of the frame in the vicinity of that pixel; and
producing a value for that pixel by using results of the occlusion characterization for that pixel comprises using a result of the ray tracing for the pixels in the identified subset of pixels.

13. The method of claim 12, wherein the pattern of ray directions represents an occlusion sampling pattern.

14. The method of claim 12, wherein the pattern of ray directions comprises a number of ray directions that is selected in accordance with the characteristics of the source of light.

15. The method of claim 1, further comprising jittering a respective origin of each of the rays within a projection of a boundary of a respective pixel for which that ray is being traced onto a respective plane that is perpendicular to a normal of a visible surface for that pixel.

16. The method of claim 1, wherein using results of the occlusion characterization for a pixel comprises blending a value generated by a shader, for each pixel in the subset of pixels that was found not to be occluded from the source of light.

17. The method of claim 1, wherein using results of the occlusion characterization for a pixel comprises determining a fraction of the pixels in the subset of pixels that were found not to be occluded from the source of light and shading that pixel using the determined fraction.

18. An apparatus for rendering images, comprising:
at least one processing module configured to:
associate each of a plurality of pixels of a frame with a ray direction and with a position within the 3-D scene, and
for each of said plurality of pixels of the frame:
trace a ray through the 3-D scene, from the position within the 3-D scene associated with that pixel in the ray direction associated with that pixel,
characterise occlusion of a source of light at the position within the 3-D scene associated with that pixel, by using a result of the ray tracing for pixels in a subset of pixels of the frame in the vicinity of that pixel, and
produce a value for that pixel, by using results of the occlusion characterization for that pixel.

19. The apparatus of claim 18, wherein at least some of the pixels in the subset are associated with different ray directions.

20. A non-transitory machine-readable medium having stored thereon a computer readable dataset description in a hardware description language that, when processed, enables fabrication of an apparatus for rendering images, the apparatus comprising:
at least one processing module configured to:
associate each of a plurality of pixels of a frame with a ray direction and with a position within the 3-D scene; and
for each of said plurality of pixels of the frame:
trace a ray through the 3-D scene, from the position within the 3-D scene associated with that pixel in the ray direction associated with that pixel;
characterise occlusion of a source of light at the position within the 3-D scene associated with that pixel, by using a result of the ray tracing for pixels in a subset of pixels of the frame in the vicinity of that pixel; and
produce a value for that pixel, by using results of the occlusion characterization for that pixel.

* * * * *